United States Patent
Matthews et al.

(10) Patent No.: US 7,321,106 B2
(45) Date of Patent: Jan. 22, 2008

(54) TIG WELDING TORCH

(75) Inventors: William T. Matthews, Chesterland, OH (US); Trang D. Nguyen, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 478 days.

(21) Appl. No.: 10/938,918

(22) Filed: Sep. 10, 2004

(65) Prior Publication Data

US 2006/0054609 A1    Mar. 16, 2006

(51) Int. Cl.
*B23K 9/067* (2006.01)

(52) U.S. Cl. .................... 219/130.4; 219/75

(58) Field of Classification Search ............ 219/75, 219/130.4, 136, 137.9
See application file for complete search history.

(56) References Cited

U.S. PATENT DOCUMENTS

| | | | |
|---|---|---|---|
| 2,395,062 A * | 2/1946 | Nielsen ............... 315/163 |
| 3,431,390 A * | 3/1969 | Manz .................. 219/75 |
| 4,855,566 A * | 8/1989 | Hays et al. ........... 219/130.4 |
| 5,117,088 A | 5/1992 | Stava | |
| 5,714,729 A | 2/1998 | Yamada | |
| 6,066,835 A * | 5/2000 | Hanks ................ 219/137.9 |
| 6,137,079 A * | 10/2000 | Vincent et al. ....... 219/130.4 |
| 6,388,232 B1 | 5/2002 | Samodell | |
| 6,399,913 B1 | 6/2002 | Sammons | |

FOREIGN PATENT DOCUMENTS

DE    3711989 A1 * 10/1988
JP    2001-138051 A * 5/2001

OTHER PUBLICATIONS

English Translation of JP2001-138051A (machine generated).*

* cited by examiner

*Primary Examiner*—Clifford C. Shaw
(74) *Attorney, Agent, or Firm*—Fay Sharpe LLP

(57) ABSTRACT

An improved TIG welding torch with a gas nozzle surrounding the fixed electrode and using a high frequency generator remote from the torch to selectively create a short burst of high frequency, high voltage to start or sustain an arc wherein a conductive layer is affixed to the gas nozzle and a conductor grounds the layer and provides shielding that drastically reduces high frequency radiation.

115 Claims, 8 Drawing Sheets

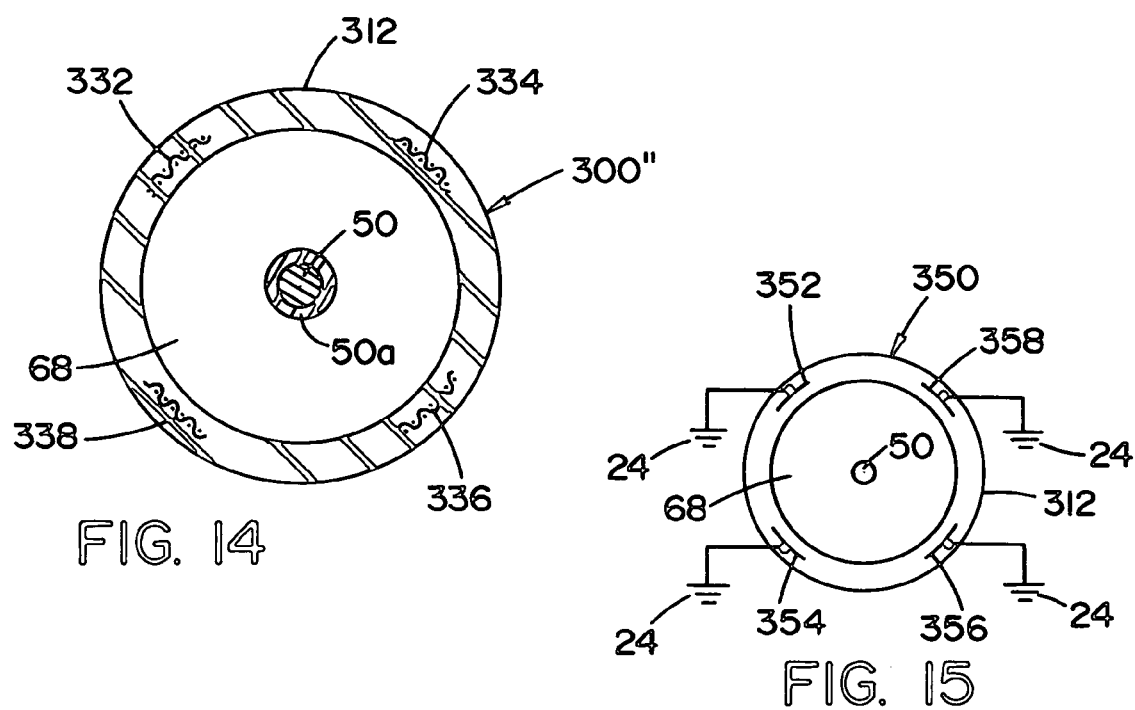
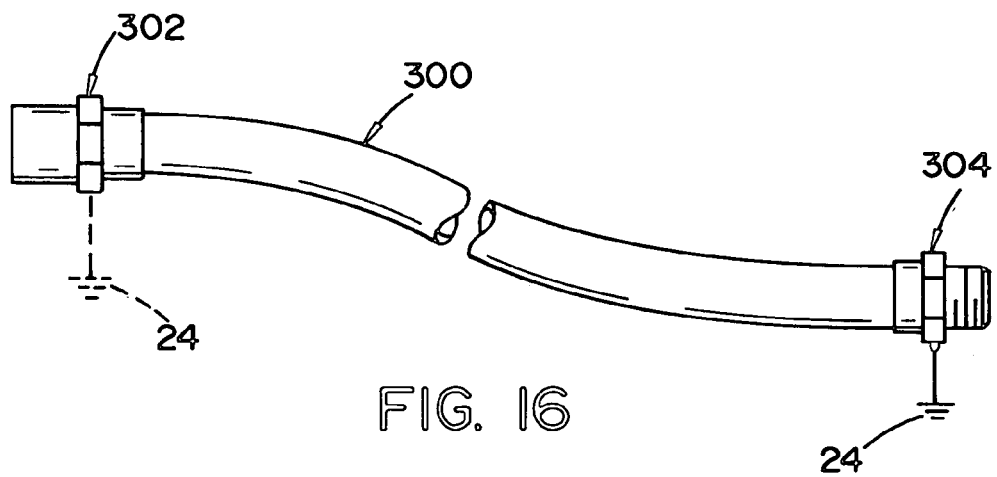

TIG WELDING TORCH

IMPROVED TIG WELDING TORCH

The present invention relates to the art of electric arc welding, primarily of the TIG welding type, and more particularly to an improved torch for TIG welding, which improved torch has other uses, such as a torch used in plasma arc cutting.

INCORPORATION BY REFERENCE

In TIG welding, a torch is connected to a remote power source by a flexible tube through which is passed a power lead and gas for creating an arc between a tungsten electrode and a workpiece, while shielding gas passes around the arc. TIG welding torches are well known and are shown in several patents, such as Sammons U.S. Pat. No. 6,399,913 and Yamada U.S. Pat. No. 5,714,729. These patents are incorporated by reference herein as background information. When using a TIG welding torch it is necessary to start the arc. There are several techniques for starting the arc; however, the common technique is generation of a high frequency, high voltage burst of energy when the arc is to be started. This high frequency burst is directed to the gap between the electrode and workpiece through the power lead as shown in Samodell U.S. Pat. No. 6,388,232. This patent discloses a high frequency generator associated with the power lead and is incorporated by reference herein as background information. One of the more effective procedures for creating the high frequency voltage burst for starting the TIG welding arc is a spark gap generator, as described in Stava U.S. Pat. No. 5,117,088, also incorporated by reference herein. The present invention relates to a high frequency burst of energy directed through the power lead to the gap between the electrode and workpiece of a TIG welder to start the arc. Such concept is also used in starting an arc for plasma cutting in a plasma cutting torch, wherein the arc is created between the electrode and a surrounding conductive nozzle. The high frequency burst is also used in AC TIG welding to reignite the arc at polarity reversals. This is illustrated in Stava U.S. Pat. No. 5,117,088. All of these patents relate to the subject matter of the present invention and are incorporated by reference as background information.

BACKGROUND OF THE INVENTION

In a typical TIG welding process, the electrode is not touched to the workpiece to initiate the welding arc. Instead, the electrode is maintained at a space from the workpiece to establish an arc gap. The arc is initiated through an arc starting apparatus, which is usually a high frequency, high voltage generator that creates an high frequency voltage burst of energy across the gap to start the arc. A high frequency generator to create the high frequency, high voltage burst across the arc through the power lead from the torch to the power source is the arc starter to which the invention is directed. Manufacturers of TIG welders have been challenged to produce a solid and good arc start every time, especially when the tungsten electrode is cold or contaminated. Conventional wisdom has been to increase the arc starter intensity by increasing the spark gap distance of the high frequency spark gap generator. The increased intensity assured that the arc jumped the gap between the electrode and workpiece. However higher intensity for the starting pulse or burst created more electrical noise radiated from the power lead acting as a transmitting antenna. This problem was amplified during AC TIG welding where the high frequency burst is required during each polarity reversal. Rapid succession of high intensity starting bursts caused substantial EMF interference. Radiated electrical noise has been the source of component failure and interference with surrounding electrical equipment adjacent the TIG welder. Thus, there is a need for a torch used in TIG welding, which torch can create a positive arc upon receipt of a lower intensity high frequency burst which need not be increased so there is extensive noise radiated to the surrounding environment. Thus, there is a need for a TIG torch that improves the arc starting ability while reducing the radiant electrical noise associated with conventional TIG welders by a reduced intensity and by allowing shielding of the power lead that radiates the noise.

As further background, a conventional TIG welding torch includes a flexible tube extending from the power source to the torch and including a gas or water passageway and a power lead so that the power lead directs welding current from the power source to the electrode in the torch. The tungsten electrode is electrically connected to the power source through the power lead inside the flexible tube or cable that is connected to a conductive collet that holds the tungsten electrode. Surrounding the tungsten electrode and conductive collet there is a component referred to as a gas nozzle that is formed from a non-conductive material, such as ceramic. This gas nozzle is mounted in a non-conductive body having a back cap that is manually manipulated during the TIG welding process. The present invention is also useful for starting the plasma arc of a plasma cutter wherein the torch is connected to the power source by a flexible tube including a power lead and a gas passageway. The power lead is connected to the fixed electrode within the plasma cutter torch, which electrode is surrounded by a nozzle similar to a conventional TIG welding torch. The high frequency, high voltage burst on the power lead used in a plasma arc cutting torch creates an arc between electrode and nozzle, which arc is then transferred by standard voltage increases associated with a plasma cutting process. Both the conventional TIG welding torch and a plasma arc cutting torch requires a burst of high frequency, high voltage energy for starting the arc. There is a need to decrease the intensity of this high voltage, high frequency energy burst while assuring that the level of energy positively starts the arc. The present invention accomplishes this objective by modifying a conventional TIG welding torch and is secondarily applicable to an improvement in a plasma arc cutting torch.

STATEMENT OF INVENTION

The invention involves a new TIG torch similar to the conventional torch, except for provision of a conductive layer affixed to the gas nozzle of the torch, preferably around the gas nozzle. An additional conductor, called the grounding conductor, connects the conductive layer to ground by extending through the flexible tube between the power source and the TIG torch. The gas nozzle is thus connected to the work terminal or ground of the welder. This connection enables the high frequency burst to arc between the tungsten electrode and the workpiece to be sufficiently reduced intensity while still starting the arc. Furthermore, to reduce the electrical noise radiated from the flexible cable or tube, the conductor grounding the layer on the gas nozzle is formed around the cable to shield the power lead carrying the high frequency burst of energy. Consequently, the conductor extending from the torch to the power source functions to ground the gas nozzle at the end of the torch and also provides an EMF shield around the flexible tube or cable extending from the torch to the power source.

In accordance with the present invention, there is provided an improvement in an electric arc processing device comprising a torch with an electrode spaced from a workpiece and defining an arc gap. This torch includes a conductor at the torch for coupling the electrode of the torch to a power lead receiving power from a remotely located power source. A conventional gas nozzle surrounds the electrode and has an internal passageway for directing shielding gas from a gas supply through the nozzle and against the workpiece. In accordance with standard technology, a high frequency generator remote from the torch selectively creates a burst of high frequency, high voltage across the gap between the electrode and workpiece at a specific or given time. The improvement of the present invention involves a conductive layer on the gas nozzle and a conductor grounding the layer. Experiments have established that by grounding the gas nozzle the intensity of the high frequency, high voltage burst of energy needed to start an arc in the gap between the electrode and workpiece is drastically reduced. Thus, the torch for the electric arc welding process is improved. This torch is primarily a TIG welding torch; however, the same advantage is accomplished by grounding the conductive gas nozzle of a plasma arc torch.

In accordance with another aspect of the invention, the improved torch, as defined above, is connected to the power source by a flexible tube extending from the improved torch to the power source with the grounding conductor extending along the tube and preferably forming an EMF shielding braid around the tube. The high frequency, high voltage burst of energy on the power lead will not be radiated as noise from the flexible tube or cable used to join the torch with the power source. If the grounding conductor is in the form of a conductive braided sleeve or sheath around the tube or cable, the grounding conductor performs two functions. It is a shield for the radiated energy and also grounds the gas nozzle of the torch. The braided sleeve or sheath can be in separate strips or can extend continuously around the circumference of the tube or cable. In the preferred implementation, the conductive sheath circumscribes at least 50% of the circumference of the flexible tube. It can be in spaced locations or strips. In accordance with an aspect of the invention, the tube or cable includes terminal connectors at each end, which connectors are joined by the grounding conductor. To optimize the invention, the grounding conductor is in the form of a woven sheath so the terminal connectors are the electrical connections of the grounding conductor at the torch and at the power source.

The flexible tube or cable between the torch and power source includes the grounding conductor and has a center gas passage for the shielding gas or gas forming the plasma of a plasma cutting torch. The conductive layer around the gas nozzle extends circumferentially around the electrode in the preferred embodiment. However, the conductive layer can have a lesser coverage of the nozzle circumference without departing from the basic concept of the invention. This concept is the grounding of the gas nozzle, preferably by a conductor extending to the remote power source. The invention is used to enhance the starting of the arc or to maintain an arc during the polarity reversals of an AC welding operation. The high energy bursts are drastically reduced to decrease the EMF transmitted during starting and/or polarity reversals.

Although the primary embodiment of the invention involves a circumscribing woven sheath for the conductor, the grounding conductor may be in the form of a coiled wire extending around the outside of the tube or cable between the torch and power source. This coiled wire performs the dual function of allowing a reduction in the intensity of the energy burst and also shielding the energy burst on the power lead from transmission to the environment.

In accordance with another aspect of the invention, there is provided a method of reducing the needed intensity of the high frequency, high voltage energy of an arc starting burst transmitted from a power source to the electrode of a torch of an electric arc processing device. This method comprises surrounding the gas nozzle of the torch with a conductive layer and grounding the conductive layer. This method is used for a TIG welder or a plasma arc cutter operated in either DC mode or the AC mode.

In accordance with still a further aspect of the present invention there is provided a gas nozzle for a torch, which gas nozzle is modified as defined above. Furthermore, there is provided a flexible cable for connecting the torch to a power source, which tube or cable is of the type defined above. These novel components constitute aspects of the present invention.

The primary object of the present invention is the provision of an improved torch of the type requiring an arc starting or arc sustaining energy burst periodically during operation, wherein the torch has a gas nozzle that is grounded.

Still a further object of the present invention is the provision of an improved torch, as defined above, which torch grounds the gas nozzle by a conductor extending through the flexible tube or cable connecting the torch with a power source.

Yet another object of the present invention is the provision of a method of reducing the necessary intensity of the arc starting energy burst, which method involves providing a conductive layer on the gas nozzle of the torch and grounding the torch, preferably by a conductor extending through the flexible tube or cable connecting the torch with the power source.

Still a further object of the present invention is the provision of the improved nozzle itself and a novel flexible cable or tube of the type extending between the power source and torch, which tube has a sheath or surrounding coiled wire constituting a nozzle grounding conductor extending through the tube or cable.

Another object of the present invention is an improved torch and novel cable, as defined above, which torch and cable can be used with conventional TIG welders or plasma arc cutters.

Yet another object of the present invention is the provision of an improved nozzle and method, as defined above, which nozzle and method allows a reduction in the magnitude of the art starting and arc sustaining burst and also a reduction in the radiation from such burst.

These and other objects and advantages will become apparent from the following description taken with the accompanying drawings.

BRIEF DESCRIPTION OF DRAWINGS

FIGS. 13 and 14 are enlarged cross-sectional views of the flexible tube similar to FIG. 11 but illustrating modifications of the grounding conductor;

FIG. 15 is a schematic cross-sectional view illustrating a further modification of the grounding conductor wherein a plurality of conductors is used in the flexible tube;

FIG. 16 is an elevational view illustrating a flexible tube of the type having terminal connectors on each end as schematically illustrated in FIG. 12;

PREFERRED EMBODIMENT

Figure 1:
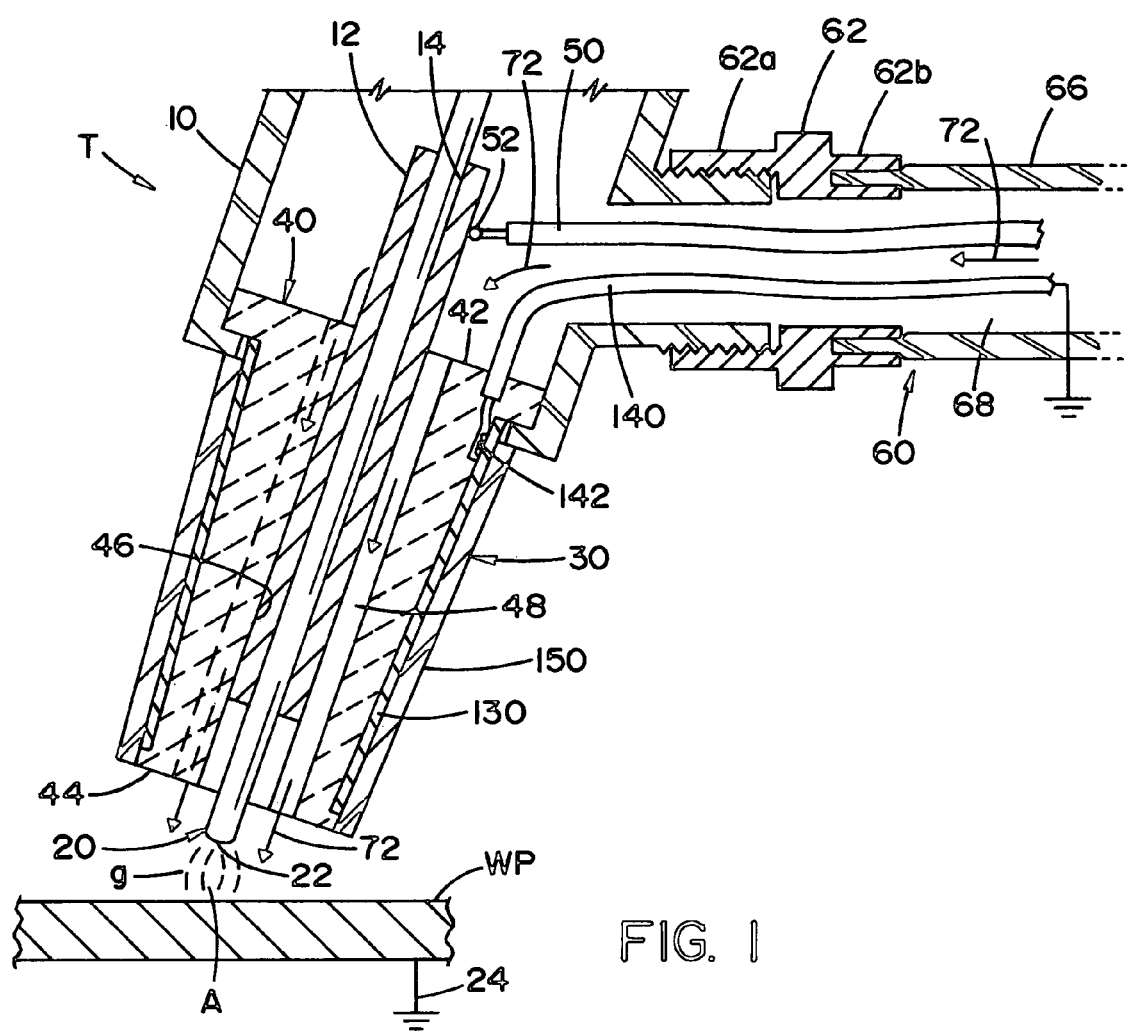
FIG. 1 is a partial cross-sectional side view showing a standard TIG welding torch and the terminal end of the tube or cable showing the improvements of the present invention.

Referring now to the drawings, wherein the showings are for the purpose of illustrating a preferred embodiment of the invention only and not for the purpose of limiting same, TIG welding torch T comprises a conventional body 10 with an internal conductive collet 12 defining an electrode opening 14 into which is held a tungsten electrode 20 having an outer end 22 spaced from workpiece WP grounded as indicated by lead 24. Tip or end 22 is spaced from the workpiece to define gap g across which an arc A is used for the welding process. Gas nozzle 30 includes a common center ceramic member 40 having opposite ends 42, 44 and an internal bore 46 for receiving electrode holding collet 12. Around bore 46 are axially extending gas passageways 48, four of which are shown. Collet 12 holds electrode 20 in a generally fixed position so body 10 can be manipulated to perform a TIG welding operation with arc A in accordance with standard technology. Power lead 50 extends through flexible tube or cable 60 connected to collet 12 at end 52 and connected to the output of a power source at end 54. Tube 60 has terminal end connectors 62, 64 and an outer surrounding rubber casing 66. Specifically, end portion 62a is threadedly connected to the body 10 and end portion 62b is connected to the tube 60. End portion 64b is likewise connected to the tube 60.

Figure 2:
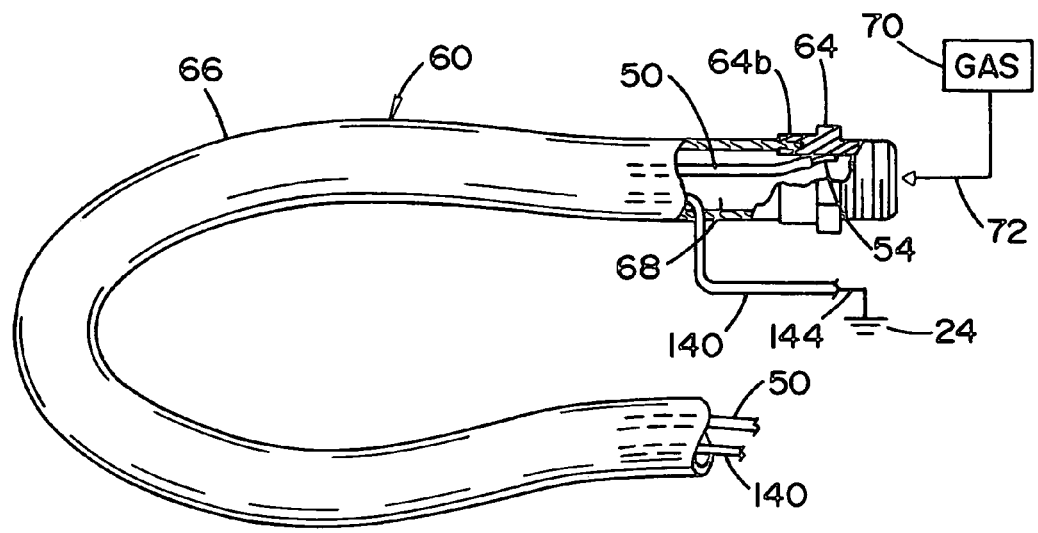
FIG. 2 is a pictorial view of the power source end of a tube or cable modified in accordance with the present invention.
Figure 3:
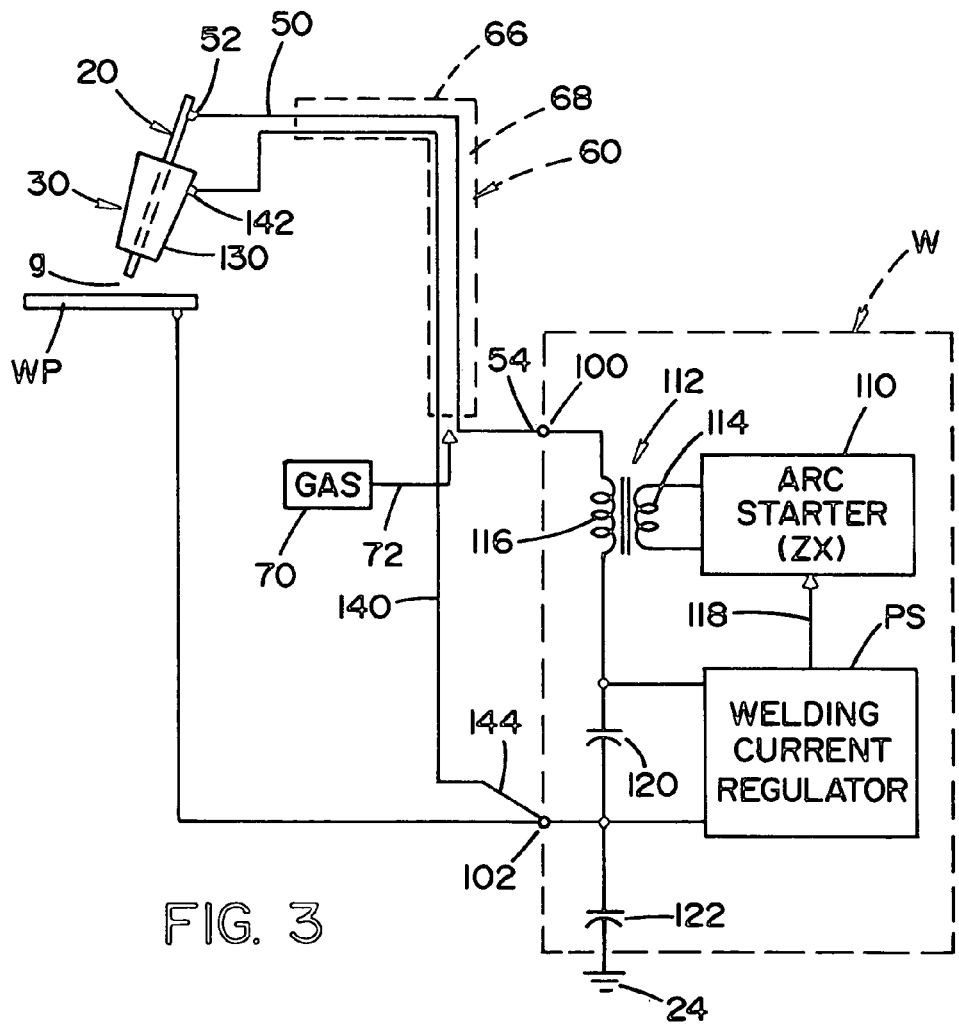
FIG. 3 is a wiring diagram illustrating schematically the preferred embodiment of the present invention.

Referring now to FIG. 3, a remotely located welder W has an internal power source PS with a terminal 100 connected to end 54 of power lead 50 and terminal 102 connected to ground 24. To start arc A or maintain the arc during polarity reversal of AC current across terminals 100, 102, there is provided a standard high frequency, high voltage generator or arc starter 110. The generator is a spark gap device as shown in Stava U.S. Pat. No. 5,117,088. The arc starter creates a burst of high frequency, high voltage on power lead 50 by way of transformer 112 having a primary winding 114 and a secondary winding 116 in series with terminal 100 as shown in FIG. 3. High frequency bypass capacitors 120, 122 are provided. Capacitor 120 provides a path for high frequency to return to winding 116. Capacitor 122 bypasses high frequency to ground to protect power source PS. When a high frequency, high voltage burst of energy is to be provided at electrode 20, a signal is directed from power source PS to generator 110 by way of line 118. In the preferred embodiment of the invention, flexible tube 60 has an internal passage 68 for power lead 50 and has a gas passageway for gas supply 70 schematically illustrated as being adjacent welder W in FIGS. 2 and 3 and having a flow pattern schematically illustrated by the arrows 72. As so far described, torch T, its gas nozzle 30 and connecting tube 60 are conventional.

Figure 4:
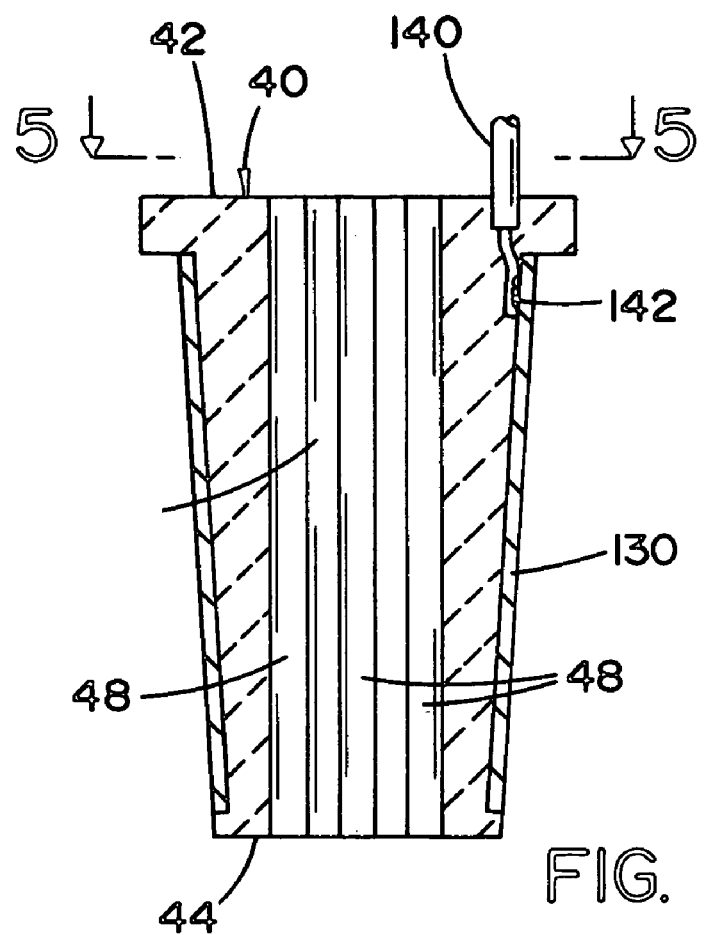
FIG. 4 is an enlarged, cross-sectional view of the gas nozzle constructed in accordance with the present invention.
Figure 5:
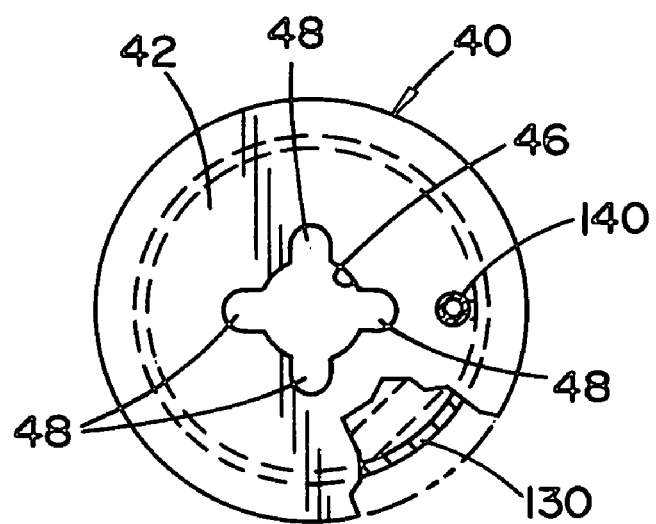
FIG. 5 is an top elevational view taken generally along line 5-5 of FIG. 4 with a portion of the nozzle shown in cross-section to illustrate the invention.

The present invention relates to an improvement in TIG welding torch T which involves a modification of gas nozzle 30 wherein a conductive layer of metal foil 130 is wrapped around ceramic member 40 and is connected to a grounding conductor 140 having a torch end 142 electrically connected to foil or layer 130 by any attaching feature (illustrated to be a solder joint in FIG. 4). Grounding conductor 140 in the preferred embodiment extends from conductive layer 130 at connector 142 through tube 60 to power source end 144, which end is electrically connected to ground 24 by way of terminal 102. This ground connection can be a direct connection; however, since the connection is made at the terminal 102 of welder W, the ground connection is through high frequency bypass capacitor 122. As far as high frequency is concerned, power source end 144 is connected to ground 24. In the preferred embodiment this ground connection is made by a wire conductor 140 extending through tube 60; however, this connection may be made in any various arrangements to electrically connect layer 130 with ground 24. The layer may not extend all the way around ceramic member 40; however, in the preferred embodiment it does surround this member. Indeed, it may be only a thin strip or conductor on the outside or internally of nozzle 30. Provision of an electrical element on gas nozzle 30 and grounding this electrical element constitutes the broadest aspect of the invention. The invention involves the nozzle itself or the improvement torch T using this nozzle. To isolate layer 130 from the operator, there is provided an insulation sleeve 150 to give a handling area for gas nozzle 30 having the modification allowing grounding in accordance with the invention.

Figure 6:
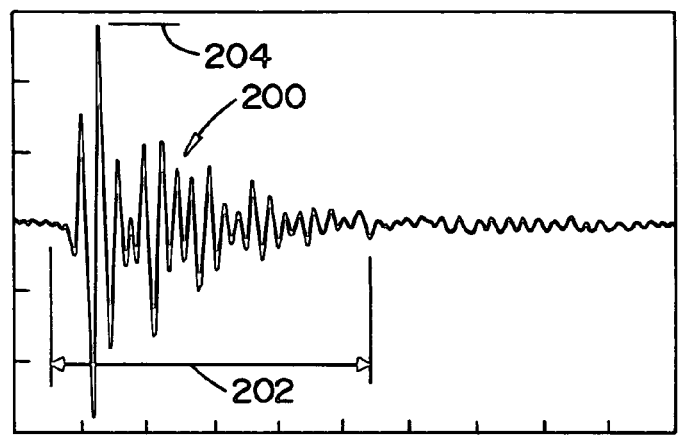
FIGS. 6-8 are RF radiation graphs observed six feet from the flexible cable in experiments to demonstrate an advantage of the present invention.
Figure 7:
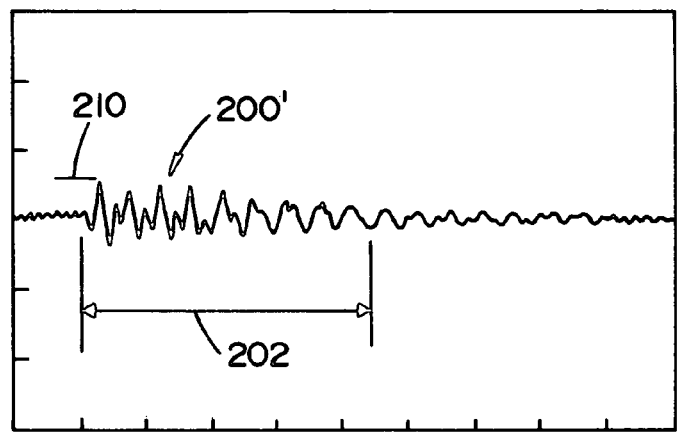
Figure 8:
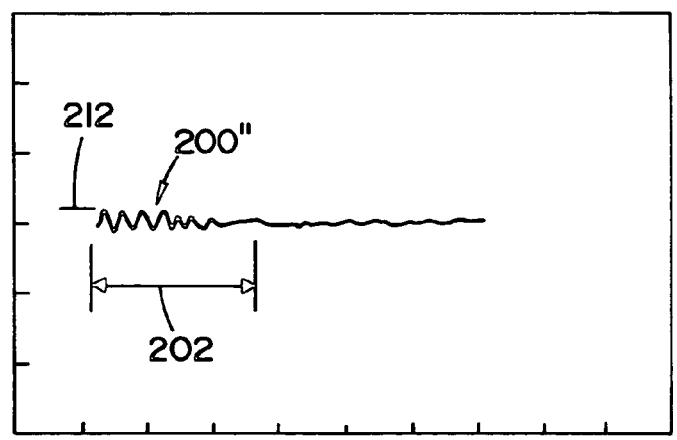
Figure 10:
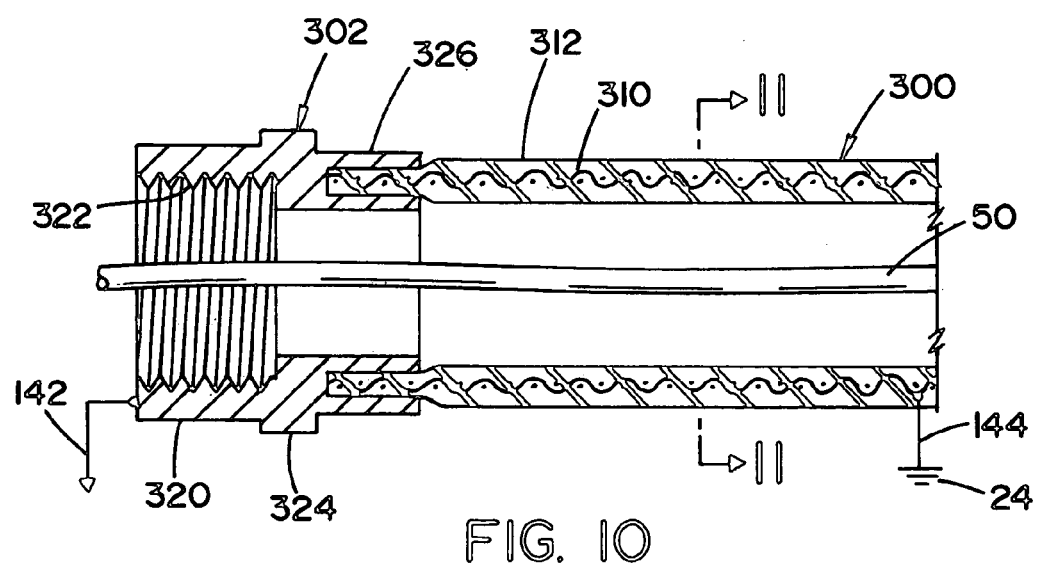
FIG. 10 is an enlarged, cross-sectional view of the terminal connector of a flexible tube or cable constructed in accordance with an aspect of the invention.
Figure 11:
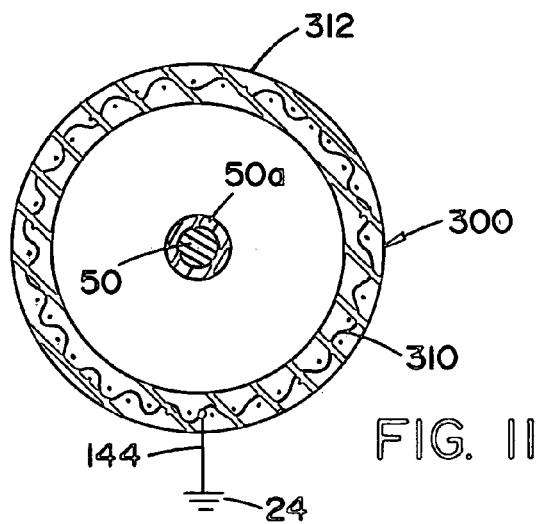
FIG. 11 is a cross-sectional view taken generally along line 11-11 of FIG. 10.
Figure 12:
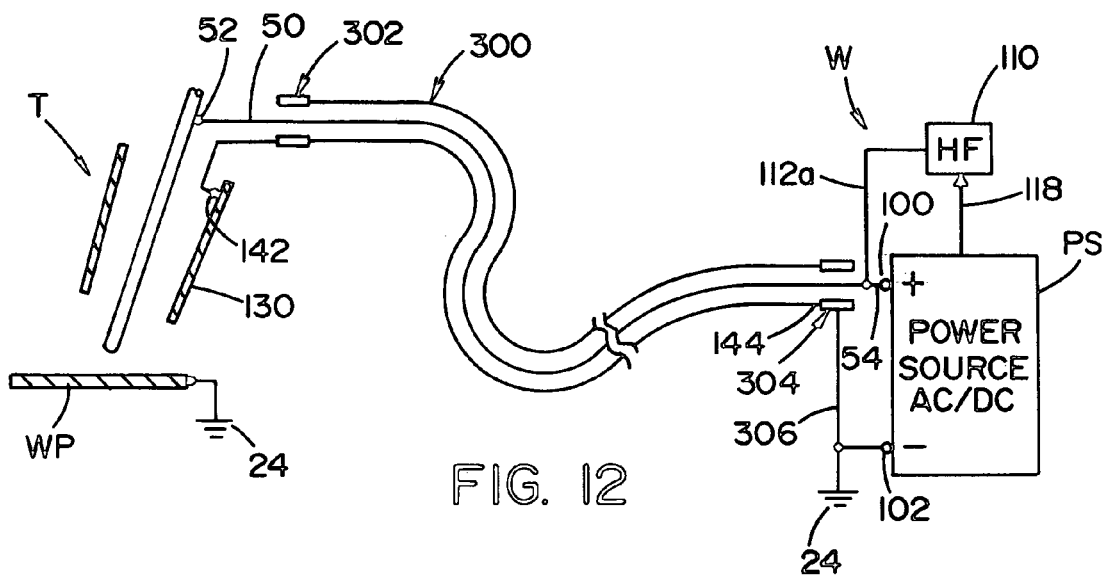
FIG. 12 is a view similar to FIG. 9 showing the embodiment of the invention wherein the grounding conductor is a sheath around the flexible tube or cable and using the tube or cable as shown in FIG. 11.

The advantage obtained by the modification of gas nozzle 30 as so far described is illustrated by the RF radiation signals shown in FIGS. 6-8. A Precision TIG 185 welder by The Lincoln Electric Company has an arc starter using a spark gap high frequency, high voltage generator 110 as shown in FIG. 3. The generator or arc starter output intensity on lead 50 depends upon the spark gap selling of the generator. The larger the arc gap selling the higher the intensity of the high frequency, high voltage energy burst. The standard spark gap setting of this machine is 0.020 inches to assure arc starting or maintenance. With the TIG welder set for 5.0 amperes in a DC mode, the welder cycle was started by a standard foot amptrol. The experiment involved a 3/32 inch diameter tungsten electrode with a sharpened point. The gas from supply 70 was pure Argon. In the experiment a fixture was employed to hold the TIG torch so tip 22 of electrode 20 was ¼ inch away from the surface of a stainless steel workpiece WP that was laid flat on a steel table. Then the welder was activated to start an arc between the tungsten electrode and the workpiece. A RF receiving coil was mounted 6 feet from tube 60 to record the magnitude of the radiated signal from power lead 50. With this experimental set up and the generator gap set at the conventional 0.020 inches, the radiated signal 200 of FIG. 6 was created by the energy burst. The radiated signal had a time of 202 and a maximum intensity 204. By modifying gas nozzle 30 as shown in FIGS. 1-5 and using a braided sheath as shown in FIGS. 10-12, the radiated signal 200' as shown in FIG. 7 was obtained for the same operation of generator 110. The level 210 was only ⅙ of the level 204 using the experiment to measure the conventional torch in FIG. 6. This illustrates the advantage of grounding the gas nozzle of torch T and using a sheath for the grounding conductor. By reducing the gap from 0.020 inches to 0.008 inches the radiated signal 200" of FIG. 8 was generated having maximum intensity 212 by the receiving coil 6 feet from tube 60. The arc started; however, it would not start using a 0.008 gap without the invention. Thus, it is possible to reduce the size of the energy burst on lead 50 and still start the arc. The actual magnitude of the starting burst or sustaining burst can be reduced. With the same burst as shown in FIG. 6 the radiation is reduced as shown in FIG. 7 by using the invention. By grounding gas nozzle 30, the experiment indicated that the starting burst could be reduced to a burst where the spark gap of the generator is set at 0.008 inches so that the radiation from this operation is the radiation shown in FIG. 8. Thus, the advantage of the present invention is the fact that by grounding the gas nozzle, the intensity of the arc starting burst and the arc sustaining burst can be drastically reduced. In the experiment the reduction was from a burst caused by a gap of 0.020 inches to a burst caused by a gap of 0.008 inches. This is a drastic reduction, but still allowed arc starting.

Figure 9:
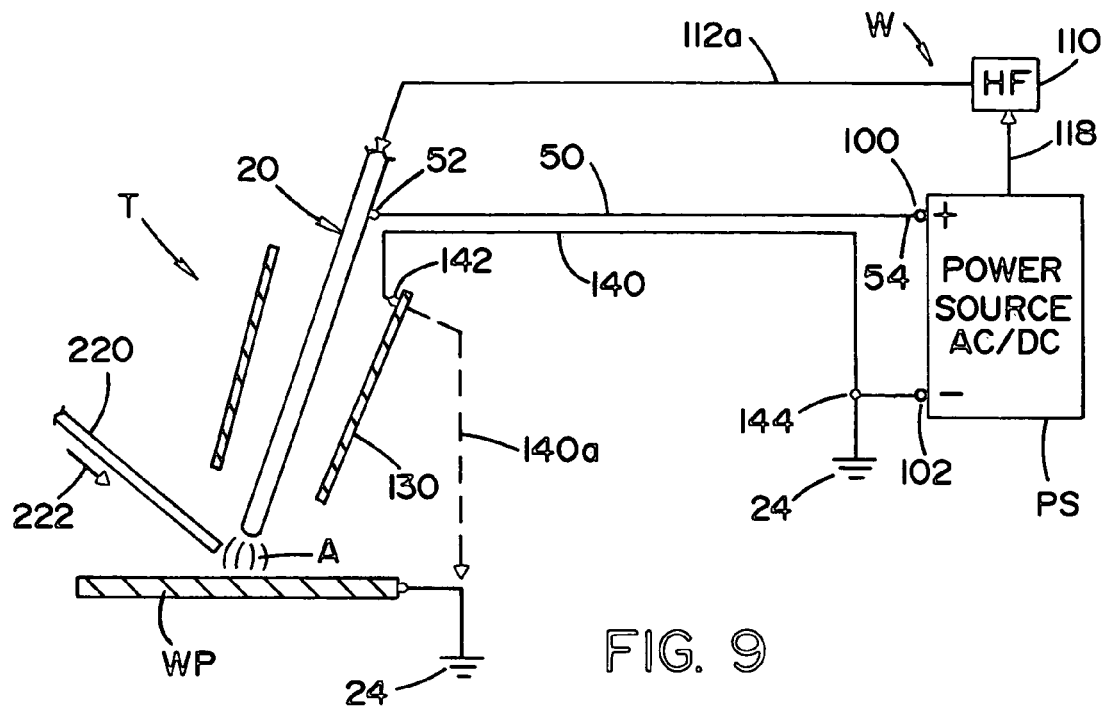
FIG. 9 is a schematic diagram showing a broad aspect of the present invention used with a TIG welding torch and a filler metal.

A broad aspect of the present invention is illustrated in FIG. 9, wherein conductive layer 130 is shown as being connected to ground 24 at terminal 102 by conductor 140. This is the preferred embodiment of the present invention, as illustrated in FIGS. 1-5. In FIG. 9, the output of the high frequency, high voltage generator 110 is represented by line 112a, which line can be a transformer or any other type of connection to communicate the high intensity burst directly to electrode 20. In a like manner, layer 130 can be grounded as indicated by line 140a to any location of ground 24. The schematic representations of FIG. 9 illustrate certain broad aspects of the invention, wherein electrode 20 receives the starting high intensity burst either through power lead 50, or otherwise, and layer 130 is grounded either through grounding conductor 140 or any other ground, such as represented by dashed line 140a. The broad aspect of the present invention is reduction of the intensity needed to start or sustain an arc during TIG welding by grounding nozzle 30.

In accordance with another aspect of the present invention, there is provided a modified flexible tube 300 extending between terminal connectors 302 and 304, the latter of which is grounded by line 306. This novel flexible tube or cable is shown in FIGS. 10-12 and includes an outer woven wire sheath 310, which sheath is the grounding conductor electrically attached between spaced terminal connectors 302, 304. Woven sheath 310 is connected to conductive layer 130 by torch end 142 attached to terminal end 302. The other end 304 of the conductive wire sheath is connected by line 306 to ground 24. In the illustrated embodiment, terminal connector 302 includes nose 320 having internal threads 322 received on a boss extending from torch T. Connector 302 is tightened onto the boss by nut portion 324 and uses gripping extension 326 to capture the end of the woven metal sheath 310, so the woven sheath is electrically connected to terminal end 302. The terminal end 302 is connected to connector 142 as previously described. Remote end 304 is similar to end 302 and forms the grounded end of woven metal sheath 310 that surrounds by encapsulating rubber envelope 312. An aspect of the invention is the cable 300 itself, which interconnects between torch T and welder W. The sheath forms a shield around lead 50 (having insulating layer 50a) to reduce the amount of EMF radiation.

Figure 13:
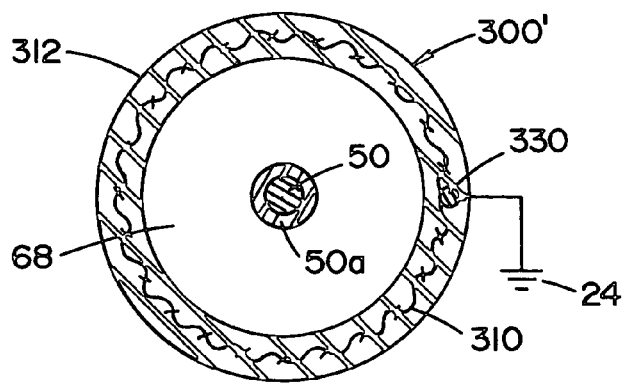

The novel flexible tube or cable 300 shown in FIG. 10-12 can be modified as illustrated in FIGS. 13-15. In FIG. 13 flexible tube or cable 300' includes metal woven sheath 310 embedded in rubber envelope 312; however, the sheath is for shielding and does not form the grounding conductor, which is a separate wire 330 embedded in envelope 312. Grounding conductor 330 could also be in the gas passageway 68; however, this would require a separate component whereas embedding grounding conductor 330 in rubber envelope 312 integrates the sheath and grounding conductor without actually using the metal sheath as the grounding conductor. It has been found that the woven sheath 310 need not completely surround power lead 50; therefore, a further embodiment is flexible tube 300" shown in FIG. 14. This embodiment includes circumferentially spaced strips 332, 334, 336 and 338 embedded at equally spaced locations in rubber envelope 312. It has been found that the circumscribed angle of the equally spaced woven strips is at least 50%. Consequently, these equally spaced strips form a shield around a majority of the emitting areas to drastically reduce any radiation from the high frequency, high voltage starting burst on power lead 50. The spaced strips are electrically connected to terminal connector ends 302 and 304. Modifications using woven shielding material in rubber envelope 312 can be employed, as shown in FIGS. 11, 13 and 14. Another concept is illustrated in FIG. 15, wherein flexible tube or cable 350 has circumferentially spaced conductors 352, 354, 356 and 358, each of which is grounded on the remote end and connected to the conductive layer 130 of gas nozzle 30. Strips 352-358 can be woven metal strips or other types of axially extending conductors. Tube 350 is representative of the concept where several grounding conductors are connected in parallel between the ground and the improved gas nozzle 30. Another implementation of the invention as shown in FIGS. 10-12 is illustrated in FIG. 16 wherein flexible tube 300 for connecting torch T with welder W has the capability of either grounding the torch terminal connector 302 or the remote power source terminal connector 304. In either instance, layer 130 of gas nozzle 30 is grounded after being connected to a flexible tube or cable 60.

Figure 17:
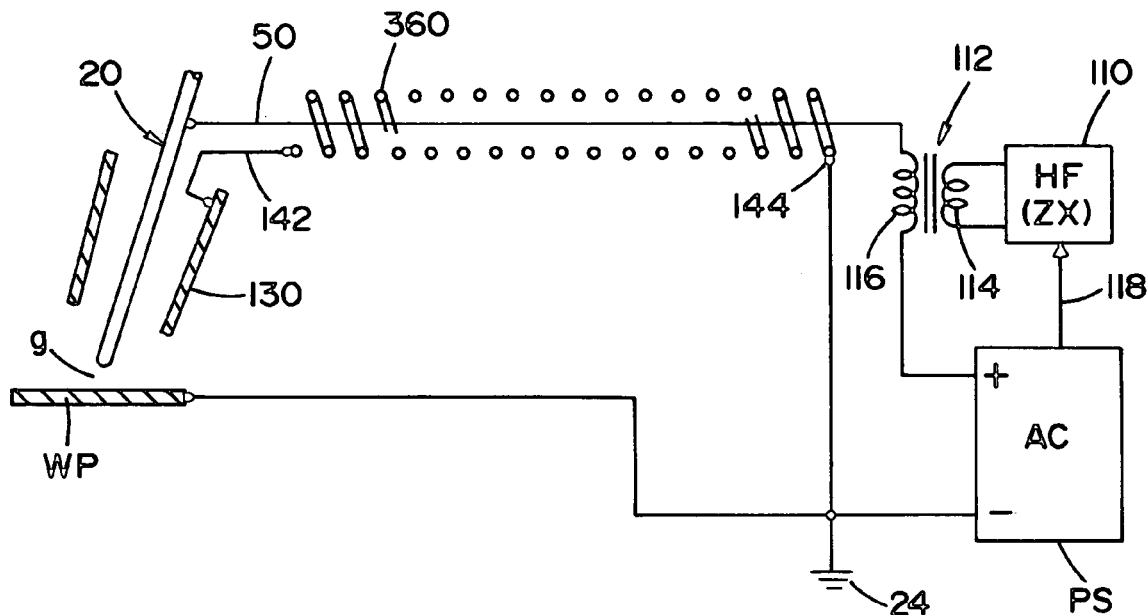
FIG. 17 is a schematic view similar to FIG. 12 showing a further modification of the grounding conductor forming another aspect of the present invention; and, FIG. 18 is a schematic view similar to FIGS. 12 and 17 showing use of the present invention in a torch for a plasma arc cutter.

In the preferred embodiment of the invention, flexible tube or cable 300, as shown in FIGS. 10-13, has a grounding conductor that also performs the function of an EMF radiation shield. This same dual function can be accomplished by a grounding conductor 360 shown in FIG. 17, wherein the conductor is a coiled wire embedded in rubber envelope 312 and surrounding power lead 50. Power source PS is illustrated as being an AC power source, so that the signal on line 118 to high frequency generator 110 is coordinated with the polarity reversal of current across gap g. The signal on line 118 indicates an impending zero crossing of the AC current. The label ZX on starter 110 indicates that generator 110 operates both at arc starting and at zero crossing. This is true of all of the embodiments of the invention illustrated. If DC welding is being performed, zero crossing energy bursts are not needed. High energy pulses occur rapidly on power lead 50 during AC welding. The energy bursts occur many times per second, which demands both the shielding, as obtained by modifying flexible tube 60, and the reduction of the intensity, as obtained by the modification of gas nozzle 30.

Figure 18:
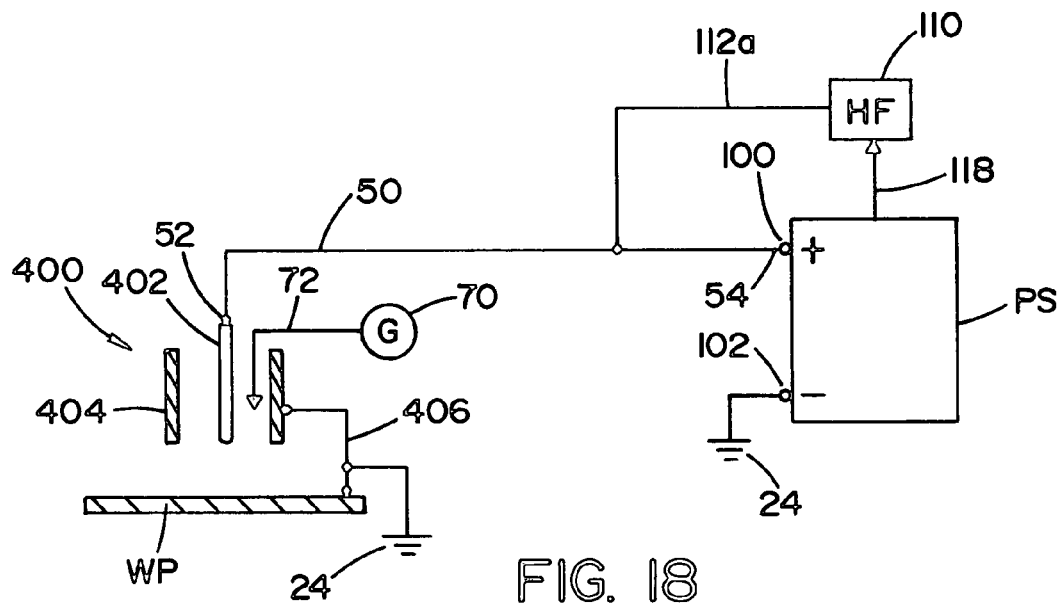

It has been found that merely grounding the gas nozzle of torch T reduces the intensity of the high frequency burst necessary for starting an arc. This concept is applicable to plasma cutters. This second use of the present invention is schematically illustrated in FIG. 18, wherein the welder W is converted into a plasma arc cutter with the same power supply PS and starting high frequency, high voltage generator 110. These components need not be described again to understand the use of the invention as illustrated in FIG. 18. Torch 400 is a conventional plasma arc cutting torch having a fixed electrode 402 and a surrounding conductive nozzle 404. To start the cutting plasma, a high frequency burst with high energy is created between electrode 402 and nozzle 404. This arc or plasma is then transferred to the workpiece WP for plasma cutting using gas from gas supply 70 as indicated by arrow 72. By grounding conductive nozzle 404 with conductor 406, the intensity of the high frequency burst to start the plasma for cutting is drastically reduced. The reduction is in the magnitude of the reduction obtained by the improvement made in torch T. The spark gap of generator 110 can be reduced from the normal 0.020 to a low value of 0.008 inches. This reduction drastically reduces the intensity and emitted radiation from power lead 50.

The present invention has been described with respect to its primary use for TIG welding and its secondary use for plasma arc cutting. The invention involves an improvement in torch T and an improvement in torch 400. Furthermore, the invention involves a novel gas nozzle for the TIG welder and a novel construction for the flexible tube between the torch and power source for both TIG welding and plasma arc cutting. Combinations and modifications of the various items disclosed in this application are within the skill of the art and can be devised by arrangements of the disclosed structures and by employing ordinary skill in the art of electric arc welding and plasma cutting.

Having thus defined the invention, the following is claimed:

1. An electric arc processing device comprising: a torch with an electrode spaced from a workpiece and defining an arc gap; a connector at said torch for coupling said electrode to a power lead receiving power from a remotely located power source; a gas nozzle surrounding said electrode and having an internal passageway for directing gas from a gas supply, through said nozzle and against said workpiece; a high frequency generator remote from said torch for selectively creating a short burst of high frequency, high voltage across said gap at a given time; a conductive layer affixed to said gas nozzle and a conductor grounding said layer; a flexible tube extending between said torch and said power source with said grounding conductor extending along said flexible tube; and an outer electrically conductive sheath surrounding said power lead and wherein said grounding conductor being a part of said sheath.

2. The electric arc processing device as defined in claim 1 wherein said sheath extends at least partially around said tube.

3. The electric arc processing device as defined in claim 2 wherein said sheath encompasses at least 50% of the circumference of said tube.

4. The electric arc processing device as defined in claim 3 wherein said tube has a terminal connector at one end electrically attached to said sheath and adapted to be electrically attached to said torch connector.

5. The electric arc processing device as defined in claim 4 wherein said tube has a second terminal connector at the opposite end of said tube wherein said second terminal connector is grounded.

6. The electric arc processing device as defined in claim 5 wherein said grounded conductor includes a plurality of parallel conductors.

7. The electric arc processing device as defined in claim 2 wherein said tube has a terminal connector at one end electrically attached to said sheath and adapted to be electrically attached to said torch connector.

8. The electric arc processing device as defined in claim 7 wherein said tube has a second terminal connector at the opposite end of said tube wherein said second terminal connector is grounded.

9. The electric arc processing device as defined in claim 2 wherein said grounded conductor includes a plurality of parallel conductors.

10. The electric arc processing device as defined in claim 2 wherein said tube is hollow and surrounds said power lead and said grounded conductor.

11. The electric arc processing device as defined in claim 10 wherein said tube contains a gas passage extending between said torch and a remotely located gas supply.

12. The electric arc processing device as defined in claim 2 wherein said tube contains a gas passage extending between said torch and a remotely located gas supply.

13. The electric arc processing device as defined in claim 12 wherein said conductive layer surrounds said gas nozzle.

14. The electric arc processing device as defined in claim 12 wherein said arc processing device is a TIG welder.

15. The electric arc processing device as defined in claim 14 wherein said power source is operated in an AC mode and said given time is when current at said electrode reverses polarity.

16. The electric arc processing device as defined in claim 12 wherein said given time is at the start of a cycle performed by said arc processing device.

17. The electric arc processing device as defined in claim 12 wherein said arc processing device is a plasma cutter and said high frequency starts said plasma.

18. The electric arc processing device as defined in claim 12 including a high frequency bypass capacitor between said layer and ground.

19. The electric arc processing device as defined in claim 12 wherein said high frequency voltage is transmitted to said gap on said power lead.

20. The electric arc processing device as defined in claim 2 wherein said arc processing device is a TIG welder.

21. The electric arc processing device as defined in claim 20 wherein said power source is operated in an AC mode and said given time is when current at said electrode reverses polarity.

22. The electric arc processing device as defined in claim 1 wherein said sheath encompasses at least 50% of the circumference of said tube.

23. The electric arc processing device as defined in claim 22 wherein said tube has a terminal connector at one end electrically attached to said sheath and adapted to be electrically attached to said torch connector.

24. The electric arc processing device as defined in claim 23 wherein said tube has a second terminal connector at the opposite end of said tube wherein said second terminal connector is grounded.

25. The electric arc processing device as defined in claim 24 wherein said grounded conductor includes a plurality of parallel conductors.

26. The electric arc processing device as defined in claim 1 wherein said tube has a terminal connector at one end electrically attached to said sheath and adapted to be electrically attached to said torch connector.

27. The electric arc processing device as defined in claim 26 wherein said tube has a second terminal connector at the opposite end of said tube wherein said second terminal connector is grounded.

28. The electric arc processing device as defined in claim 1 wherein said grounded conductor includes a plurality of parallel conductors.

29. The electric arc processing device as defined in claim 1 wherein said tube is hollow and surrounds said power lead and said grounded conductor.

30. The electric arc processing device as defined in claim 29 wherein said tube contains a gas passage extending between said torch and a remotely located gas supply.

31. The electric arc processing device as defined in claim 1 wherein said tube is hollow and surrounds said power lead and said grounded conductor.

32. The electric arc processing device as defined in claim 31 wherein said tube contains a gas passage extending between said torch and a remotely located gas supply.

33. The electric arc processing device as defined in claim 1 wherein said tube contains a gas passage extending between said torch and a remotely located gas supply.

34. The electric arc processing device as defined in claim 33 wherein said conductive layer surrounds said gas nozzle.

35. The electric arc processing device as defined in claim 33 wherein said arc processing device is a TIG welder.

36. The electric arc processing device as defined in claim 35 wherein said power source is operated in an AC mode and said given time is when current at said electrode reverses polarity.

37. The electric arc processing device as defined in claim 33 wherein said given time is at the start of a cycle performed by said arc processing device.

38. The electric arc processing device as defined in claim 33 wherein said arc processing device is a plasma cutter and said high frequency starts said plasma.

39. The electric arc processing device as defined in claim 33 including a high frequency bypass capacitor between said layer and ground.

40. The electric arc processing device as defined in claim 33 wherein said high frequency voltage is transmitted to said gap on said power lead.

41. The electric arc processing device as defined in claim 1 wherein said conductive layer surrounds said gas nozzle.

42. The electric arc processing device as defined in claim 1 wherein said arc processing device is a TIC welder.

43. The electric arc processing device as defined in claim 42 wherein said power source is operated in an AC mode and said given time is when current at said electrode reverses polarity.

44. The electric arc processing device as defined in claim 1 wherein said given time is at the start of a cycle performed by said arc processing device.

45. The electric arc processing device as defined in claim 1 wherein said arc processing device is a plasma cutter and said high frequency starts said plasma.

46. The electric arc processing device as defined in claim 1 including a high frequency bypass capacitor between said layer and ground.

47. The electric arc processing device as defined in claim 1 wherein said high frequency voltage is transmitted to said gap on said power lead.

48. An electric arc processing device comprising: a torch with an electrode spaced from a workpiece and defining an arc gap; a connector at said torch for coupling said electrode to a power lead receiving power from a remotely located power source; a gas nozzle surrounding said electrode and having an internal passageway for directing gas from a gas supply, through said nozzle and against said workpiece; a high frequency generator remote from said torch for selectively creating a short burst of high frequency, high voltage across said gap at a given time; a conductive layer affixed to said gas nozzle and a conductor grounding said layer; and a flexible tube extending between said torch and said power source with said grounding conductor extending along said flexible tube, wherein said tube is hollow and surrounds said power lead and said grounded conductor.

49. The electric arc processing device as defined in claim 48 wherein said tube contains a gas passage extending between said torch and a remotely located gas supply.

50. The electric arc processing device as defined in claim 49 wherein said conductive layer surrounds said gas nozzle.

51. The electric arc processing device as defined in claim 49 wherein said arc processing device is a TIG welder.

52. The electric arc processing device as defined in claim 51 wherein said power source is operated in an AC mode and said given time is when current at said electrode reverses polarity.

53. The electric arc processing device as defined in claim 49 wherein said given time is at the start of a cycle performed by said arc processing device.

54. The electric arc processing device as defined in claim 49 wherein said arc processing device is a plasma cutter and said high frequency starts said plasma.

55. The electric arc processing device as defined in claim 49 including a high frequency bypass capacitor between said layer and ground.

56. The electric arc processing device as defined in claim 49 wherein said high frequency voltage is transmitted to said gap on said power lead.

57. The electric arc processing device as defined in claim 48 wherein said conductive layer surrounds said gas nozzle.

58. The electric arc processing device as defined in claim 48 wherein said arc processing device is a TIG welder.

59. The electric arc processing device as defined in claim 58 wherein said power source is operated in an AC mode and said given time is when current at said electrode reverses polarity.

60. The electric arc processing device as defined in claim 48 wherein said given time is at the start of a cycle performed by said arc processing device.

61. The electric arc processing device as defined in claim 48 wherein said arc processing device is a plasma cutter and said high frequency starts said plasma.

62. The electric arc processing device as defined in claim 48 including a high frequency bypass capacitor between said layer and ground.

63. The electric arc processing device as defined in claim 48 wherein said high frequency voltage is transmitted to said gap on said power lead.

64. An electric arc processing device comprising: a torch with an electrode spaced from a workpiece and defining an arc gap; a connector at said torch for coupling said electrode to a power lead receiving power from a remotely located power source; a gas nozzle surrounding said electrode and having an internal passageway for directing gas from a gas supply, through said nozzle and against said workpiece; a high frequency generator remote from said torch for selectively creating a short burst of high frequency, high voltage across said gap at a given time; a conductive layer affixed to said gas nozzle and a conductor grounding said layer; a flexible tube extending between said torch and said power source with said grounding conductor extending along said flexible tube; and a high frequency bypass capacitor between said layer and ground.

65. The electric arc processing device as defined in claim 64 wherein said conductive layer surrounds said gas nozzle.

66. The electric arc processing device as defined in claim 65 wherein said grounding conductor extends from said power source to said torch.

67. The electric arc processing device as defined in claim 66 wherein said ground conductor is a coiled wire surrounding said power lead.

68. The electric arc processing device as defined in claim 64 wherein said arc processing device is a TIG welder.

69. The electric arc processing device as defined in claim 68 wherein said power source is operated in an AC mode and said given time is when current at said electrode reverses polarity.

70. The electric arc processing device as defined in claim 69 wherein said grounding conductor extends from said power source to said torch.

71. The electric arc processing device as defined in claim 70 wherein said ground conductor is a coiled wire surrounding said power lead.

72. The electric arc processing device as defined in claim 68 wherein said grounding conductor extends from said power source to said torch.

73. The electric arc processing device as defined in claim 72 wherein said ground conductor is a coiled wire surrounding said power lead.

74. The electric arc processing device as defined in claim 64 wherein said given time is at the start of a cycle performed by said arc processing device.

75. The electric arc processing device as defined in claim 74 wherein said grounding conductor extends from said power source to said torch.

76. The electric arc processing device as defined in claim 75 wherein said ground conductor is a coiled wire surrounding said power lead.

77. The electric arc processing device as defined in claim 64 wherein said arc processing device is a plasma cutter and said high frequency starts said plasma.

78. The electric arc processing device as defined in claim 77 wherein said grounding conductor extends from said power source to said torch.

79. The electric arc processing device as defined in claim 78 wherein said ground conductor is a coiled wire surrounding said power lead.

80. The electric arc processing device as defined in claim 64 wherein said high frequency voltage is transmitted to said gap on said power lead.

81. The electric arc processing device as defined in claim 80 wherein said grounding conductor extends from said power source to said torch.

82. The electric arc processing device as defined in claim 81 wherein said ground conductor is a coiled wire surrounding said power lead.

83. The electric arc processing device as defined in claim 64 wherein said ground conductor is a coiled wire surrounding said power lead.

84. The electric arc processing device as defined in claim 64 wherein said grounding conductor extends from said power source to said torch.

85. The electric arc processing device as defined in claim 84 wherein said ground conductor is a coiled wire surrounding said power lead.

86. A method of reducing the needed intensity of the high frequency, high voltage energy transmitted from a power source to the electrode in a gas nozzle of an electric arc processing device, said method comprising:
(a) at least partially surrounding said gas nozzle with a conductive layer and surrounding said conductive layer with an insulated sleeve; and,
(b) grounding said layer.

87. A method as defined in claim 86 wherein said device is a TIG welder operated in a DC mode and including:
(c) applying said high frequency voltage at the start of the welding cycle.

88. A method as defined in claim 86 wherein said device is a TIG welder operated in an AC mode and including:
(c) applying said high frequency voltage at each polarity reversal.

89. A method as defied in claim 86 wherein said device is a plasma cutter and including:
(c) applying said high frequency voltage at the start of the cutting cycle.

90. A gas nozzle for a torch used in a TIG welder or plasma cutter, said nozzle including an electrically insulated body with a internal passageway accommodating a non-consumable electrode and a conductive layer at least partially around said body of said nozzle for grounding said insulated body, said nozzle further including an insulated sleeve surrounding said conductive layer.

91. A gas nozzle as defined in claim 90 wherein said conductive layer entirely surrounds said body.

92. A gas nozzle as defined in claim 90 wherein said grounding conductor extends from said power source to said torch.

93. A gas nozzle as defined in claim 90 including a high frequency bypass capacitor between said conductive layer and ground.

94. A flexible tube for connecting a TIG torch to a power source, said torch having an electrode surrounded by a gas nozzle with an outer conductive layer, said tube comprising: a first end adjacent said torch and a second end adjacent said power source, a power lead between said ends, a grounding conductor extending between said ends for grounding said conductive layer at a location adjacent said second end, and an outer electrically conductive sheath surrounding said power lead.

95. A flexible tube as defined in claim 94 wherein said grounding conductor is pad of said sheath.

96. A flexible tube as defined in claim 95 wherein said sheath extends only partially around said tube.

97. A flexible tube as defined in claim 96 wherein said sheath encompasses at least 50% of the circumference of said tube.

98. A flexible tube as defined in claim 97 wherein said tube has a terminal connector at each end, said connectors attached to said conductive sheath.

99. A flexible tube as defined in claim 96 wherein said tube has a terminal connector at each end, said connectors attached to said conductive sheath.

100. A flexible tube as defined in claim 95 wherein said sheath encompasses at least 50% of the circumference of said tube.

101. A flexible tube as defined in claim 100 wherein said tube has a terminal connector at each end, said connectors attached to said conductive sheath.

102. A flexible tube as defined in claim 95 wherein said tube has a terminal connector at each end, said connectors attached to said conductive sheath.

103. A flexible tube as defined in claim 95 wherein said surrounding conductor includes a plurality of parallel conductors.

104. A flexible tube as defined in claim 103 including a central gas passageway extending between said ends.

105. A flexible tube as defined in claim 95 including a central gas passageway extending between said ends.

106. A flexible tube as defined in claim 94 wherein said ground conductor is a coiled wire surrounding said power lead.

107. A flexible tube as defined in claim 106 wherein said sheath encompasses at least 50% of the circumference of said tube.

108. A flexible tube as defined in claim 107 wherein said tube has a terminal connector at each end, said connectors attached to said conductive sheath.

109. A flexible tube as defined in claim 106 wherein said tube has a terminal connector at each end, said connectors attached to said conductive sheath.

110. A flexible tube as defined in claim 94 wherein said sheath encompasses at least 50% of the circumference of said tube.

111. A flexible tube as defined in claim 110 wherein said tube has a terminal connector at each end, said connectors attached to said conductive sheath.

112. A flexible tube as defined in claim 94 wherein said tube has a terminal connector at each end, said connectors attached to said conductive sheath.

113. A flexible tube as defined in claim 112 wherein said surrounding conductor includes a plurality of parallel conductors.

114. A flexible tube as defined in claim 94 wherein said surrounding conductor includes a plurality of parallel conductors.

115. A flexible tube as defined in claim 94 including a central gas passageway extending between said ends.

* * * * *